US012678745B2

(12) United States Patent
Jokar et al.

(10) Patent No.: US 12,678,745 B2
(45) Date of Patent: Jul. 14, 2026

(54) DEVICE FOR HOMOGENIZING A GAS DISTRIBUTION IN A PROCESS CHAMBER

(71) Applicant: VAT Holding AG, Haag (CH)

(72) Inventors: Samir Jokar, Buchs (CH); Sven Rieschl, Malans (CH); Daniel Dünser, San Francisco, CA (US)

(73) Assignee: VAT Holding AG, Haag (CH)

( * ) Notice: Subject to any disclaimer, the term of this patent is extended or adjusted under 35 U.S.C. 154(b) by 837 days.

(21) Appl. No.: 18/161,137

(22) Filed: Jan. 30, 2023

(65) Prior Publication Data

US 2023/0241560 A1 Aug. 3, 2023

(30) Foreign Application Priority Data

Jan. 28, 2022 (DE) ......................... 102022102035.5

(51) Int. Cl.

*B01F 23/10* (2022.01)
*B01F 35/90* (2022.01)
*B01F 35/93* (2022.01)
*F26B 21/00* (2026.01)
*F27D 7/04* (2006.01)

(52) U.S. Cl.

CPC .............. *B01F 23/10* (2022.01); *B01F 35/93* (2022.01); *F26B 21/00* (2013.01); *F27D 7/04* (2013.01); *B01F 2035/99* (2022.01)

(58) Field of Classification Search

CPC .......... F26B 21/00; F26B 21/10; F26B 25/02; B01F 23/10; B01F 35/93; B01F 2035/99; B01F 31/441; F27D 7/04; H10P 72/0402; C23C 16/455; C23C 16/54

See application file for complete search history.

(56) References Cited

U.S. PATENT DOCUMENTS

2005/0051100 A1 3/2005 Chiang et al.
2008/0166884 A1* 7/2008 Nelson .............. C23C 16/45574 118/715
2015/0187542 A1 7/2015 Ishida
(Continued)

FOREIGN PATENT DOCUMENTS

CN 112074923 A * 12/2020 ......... H01H 33/7038
CN 114134486 3/2022
(Continued)

OTHER PUBLICATIONS

Translation, CN-112074923-A (Year: 2020).*

*Primary Examiner* — Jessica Yuen
(74) *Attorney, Agent, or Firm* — Volpe Koenig

(57) ABSTRACT

A device (1) for homogenizing a gas distribution in a process chamber (2). The device (1) has a aperture shield (3) and a linear drive (4) for moving the aperture shield (3) in a reciprocating manner in two mutually opposite linear movement directions (5) between two terminal positions. The aperture shield (3) is able to be heated by at least one heating installation (6) of the device (1), and the aperture shield (3) by way of at least one interposed compensation element (7) of the device (1) is connected to the linear drive (4). The compensation element (7) enables a relative movement between the aperture shield (3) and the linear drive (4) in at least one direction (8) transverse, preferably orthogonal, to the linear movement directions (5) of the aperture shield (3).

11 Claims, 6 Drawing Sheets

(56) References Cited

U.S. PATENT DOCUMENTS

| | | | |
|---|---|---|---|
| 2019/0285184 | A1 | 9/2019 | Netzer |
| 2020/0402775 | A1 | 12/2020 | Hayasaka et al. |
| 2021/0027994 | A1 | 1/2021 | Motegi et al. |
| 2021/0066046 | A1 | 3/2021 | Oh et al. |

FOREIGN PATENT DOCUMENTS

| | | |
|---|---|---|
| DE | 102010000447 | 8/2011 |
| KR | 1020220045512 | 4/2022 |

* cited by examiner

DEVICE FOR HOMOGENIZING A GAS DISTRIBUTION IN A PROCESS CHAMBER

CROSS-REFERENCE TO RELATED APPLICATIONS

This application claims the benefit of German Patent Application No. 10 2022 102 035.5, filed Jan. 28, 2022, which is incorporated herein by reference as if fully set forth.

TECHNICAL FIELD

The present invention relates to a device for homogenizing a gas distribution in a process chamber, wherein the device has an aperture shield and a linear drive for moving the aperture shield in a reciprocating manner in two mutually opposite linear movement directions between two terminal positions.

BACKGROUND

In processes in which the workpieces to be treated have to be processed in a process chamber using a predefined gas atmosphere, or a gas atmosphere matched to the respective process, generic devices are used to ensure the uniformity or homogeneity of the gas composition to a sufficient degree.

SUMMARY

It is an object of the invention to further improve generic devices in this context such that said devices can ensure as good as possible a homogenization of the gas distribution in the process chamber.

In order to achieve this object, a device with one or more features as disclosed herein is provided.

According to the invention, it is thus provided that the aperture shield is able to be heated by at least one heating installation of the device, and that the aperture shield by way of at least one interposed compensation element of the device is connected to the linear drive, wherein the compensation element enables a relative movement between the aperture shield and the linear drive in at least one direction transverse, preferably orthogonal, to the linear movement directions of the aperture shield.

The aperture shield by way of the heating installation can be temperature controlled so as to be heated precisely to the temperature desired for the respective process. As a result, temperature-related convection movements in the gas atmosphere in the process chamber can be avoided. In order to avoid temperature-related mechanical stresses between the aperture shield and the linear drive, the compensation element which enables a relative movement between the heated aperture shield and the typically non-heated linear drive in the at least one direction transverse to the linear movement direction of the aperture shield is provided in the case of devices according to the invention.

The device according to the invention, by way of the aperture shield thereof, thus particularly readily ensures a homogenization, or a high degree of uniformity, of the gas atmosphere in the process chamber in that in particular turbulences and currents in the gas atmosphere are avoided by the aperture shield.

The aperture shield is to be distinguished from a closure element of a valve. While a closure element is provided for the purpose of closing a chamber wall opening in a gas-tight and pressure-tight manner, the aperture shield is used to the maximum for covering the chamber wall opening, or in other words for screening the chamber wall opening. An aperture shield thus does not close a chamber wall opening in a gas-tight or pressure-tight manner. As opposed to the closure element, the aperture shield indeed serves the sole purpose of homogenizing the gas distribution in the process chamber.

In preferred embodiments of the invention, the aperture shield is able to be moved exclusively in the two mutually opposite linear movement directions. In these preferred variants, said aperture shield can thus perform no other movement. It is typically provided that the aperture shield in one of the terminal positions thereof covers the chamber, or in other words screens the chamber, and in the other one of the terminal positions thereof opens up the chamber opening. In the opened-up state of the chamber opening, workpieces can then be introduced through the chamber opening into the chamber interior, and/or retrieved from the chamber interior.

The heating installation can fundamentally be configured in various ways. In preferred variants, however, said heating installation is an electric heating installation, in particular an electric resistance or induction heater.

The compensation element permits a certain relative movement between the linear drive and the heated aperture shield. This is primarily utilized for avoiding thermal stresses in the device.

Preferred variants of the invention provide that the compensation element has a sleeve and a head which is mounted in the sleeve so as to be movable in the direction transverse, preferably orthogonal, to the linear movement directions of the aperture shield. In variants thereof that are preferred in turn, it is provided that an elastically deformable member, preferably an elastomer member, is disposed between the sleeve and the head. In principle, the head can have virtually any arbitrary shape as long as said head is mounted so as to be correspondingly movable in the sleeve. As a result of the elastically deformable member which is disposed between the sleeve and the head, a position without play between the sleeve and the head is achieved. Additionally, the elastically deformable member can also make available restoring forces which counteract the thermal stresses and, in the absence of the latter, ensure a corresponding restoring action again. How the compensation element is installed between the linear drive and the aperture shield is a matter of preference of the person skilled in the art. The sleeve can thus be connected to the linear drive, and the head to the compensation element. However, the reverse arrangement is also equally possible. It is also important to note in this context that the compensation element can however also be connected directly or else indirectly to the linear drive, on the one hand, and to the aperture shield, on the other hand. It can thus be provided, for example, that at least one thrust bar is fixed to the aperture shield, and the compensation element is disposed between the linear drive and the thrust bar. In particularly preferred variants, the compensation element here is connected to the thrust bar by way of an element guided on a guide rail. The guide rail in turn can be fixed to a device housing of the device.

Particularly preferred variants provide that at least two thrust bars are fixed to the aperture shield, and the device, for each thrust bar, has at least one compensation element for enabling the relative movement between the aperture shield and the linear drive in the at least one direction transverse, preferably orthogonal, to the linear movement directions of the aperture shield, and a yoke is fixed to the linear drive, wherein each of the thrust bars by way of at least one of the interposed compensation elements is connected to the yoke. It is particularly preferably provided here that the yoke is configured so as to be elongate in the direction transverse, preferably orthogonal, to the linear movement directions of the aperture shield, and the compensation elements are connected to the yoke in a mutually spaced apart manner. The heating installation for heating the aperture shield can be disposed in the thrust bar or in at least one of the thrust bars. In the case of a plurality of thrust bars it is preferably provided that a respective heating installation for heating the aperture shield is disposed in each of the thrust bars.

Preferred variants of the invention provide that the device has a device housing and at least one guide rail fixed to the device housing, wherein the at least one thrust bar, preferably by a guided element, is mounted on the least one guide rail so as to be displaceable parallel to the linear movement directions of the aperture shield.

With a view to as good as possible a homogenization of the gas distribution in the process chamber, preferred variants provide that the aperture shield at least in regions is configured so as to be annular and encloses in an annular manner an aperture interior for receiving a workpiece to be processed. The term annular may describe a circular ring shape but is not limited to a circular ring shape. Rather, said term annular is to be understood to mean that the aperture interior, in a plan view, is surrounded so as to be circumferentially closed by the aperture shield. A particularly well homogenized or uniform gas distribution can then be ensured in the aperture interior such that the optimum conditions for processing the workpiece prevail here.

Besides the device per se, the invention also relates to a process chamber having a chamber interior and a chamber wall surrounding the chamber interior, wherein at least one chamber wall opening for introducing at least one workpiece into the chamber interior and/or for retrieving the workpiece from the chamber interior is disposed in the chamber wall. This process chamber is characterized in that in the chamber interior the aperture shield of a device according to the invention is disposed so as to be movable in a reciprocating manner between the terminal positions, wherein the aperture shield in one of the terminal positions thereof covers the chamber opening and in the other one of the terminal positions thereof opens up the chamber opening.

As was already explained at the outset, a distinction has to be made also here between covering the chamber wall opening by the aperture shield, or in other words screening the chamber wall opening by the aperture shield, and closing the chamber wall opening by a closure element of a valve.

BRIEF DESCRIPTION OF THE DRAWINGS

Further features and details of preferred variants of the invention will be discussed by way of example hereunder by design embodiments. In the figures.

DETAILED DESCRIPTION

Figure 1:
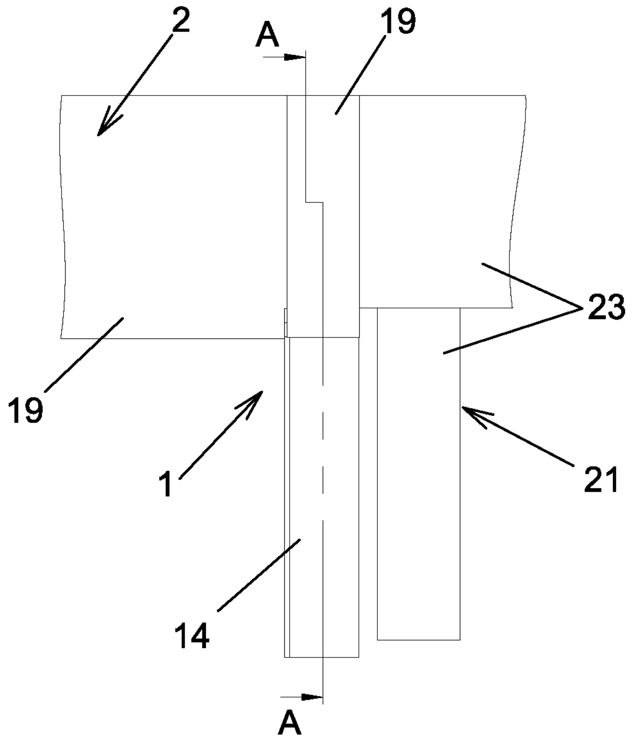
FIG. 1 shows a schematic lateral view of a process chamber having a device according to the invention and a valve.

FIG. 1 shows a schematic external lateral view of a process chamber 2 having a device 1 according to the invention disposed therein. A valve 21 along with the valve housing 23 thereof is located on that side of the device 1 that lies opposite the process chamber 2. The device 1 is integrated in the process chamber 2 such that the aperture shield 3 is located within the process chamber 2, thus in the chamber interior 18, and a device housing 14 in which the linear drive 4 of the device 1 is located adjoins the process chamber 2.

Figure 3:
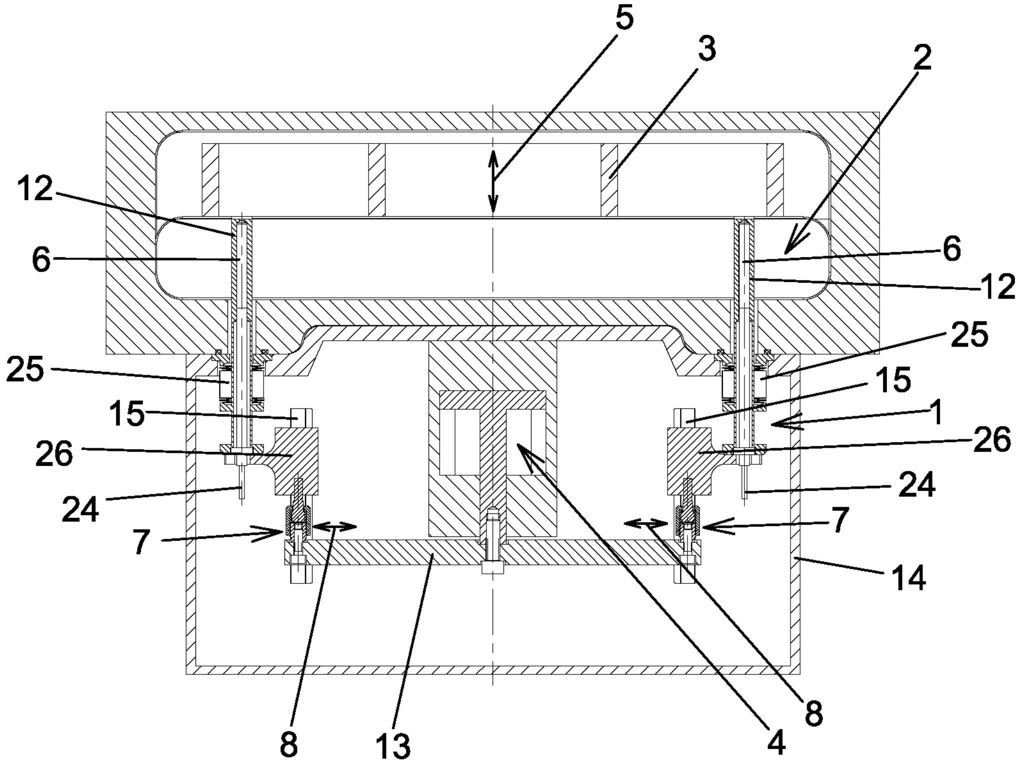
FIG. 3 shows a section along the section line A-A from FIG. 1, wherein a terminal position in which the aperture shield covers the chamber opening is shown.
Figure 6:
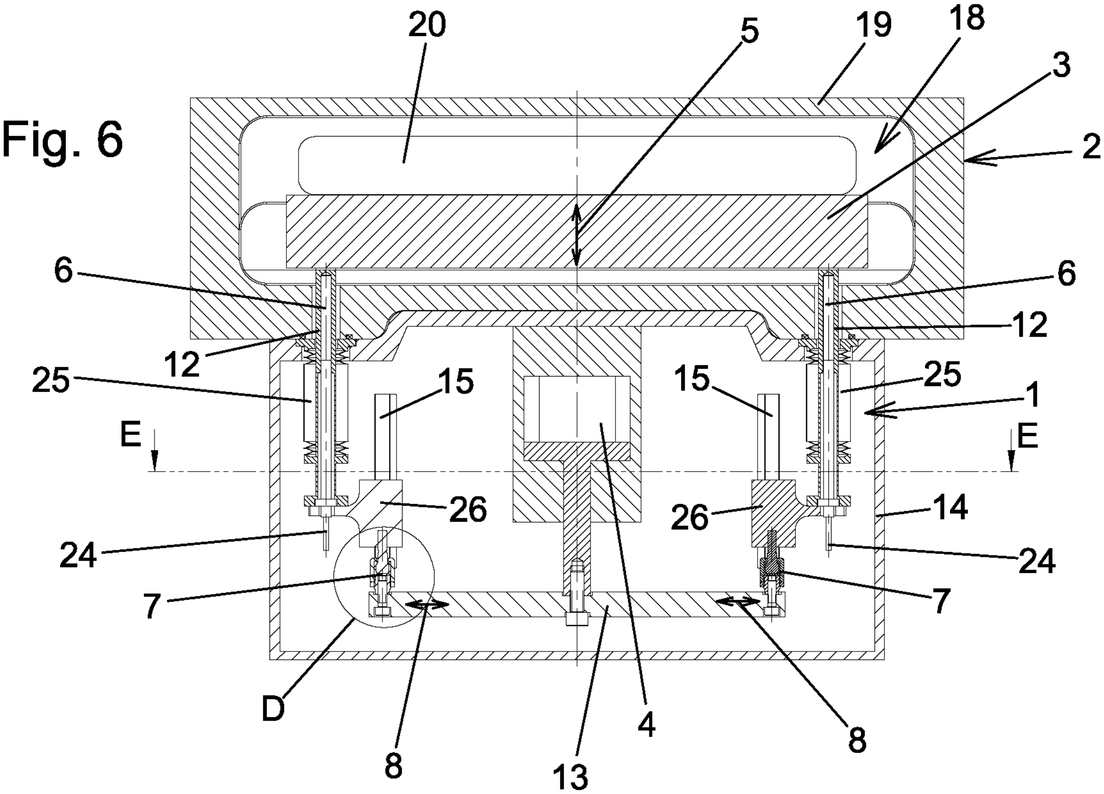
FIG. 6 shows a section along the section line A-A, wherein the terminal position in which the aperture shield opens up the chamber opening is shown.

The valve 21 can be an arbitrary valve known per se in the prior art and suitable for the respective application. Said valve is illustrated only for the sake of completeness here, but is to be considered as being independent of the invention. Also depicted in FIG. 1 is the section line A-A. The assigned sections along the section line A-A are shown in FIGS. 3 and 6.

Figure 2:
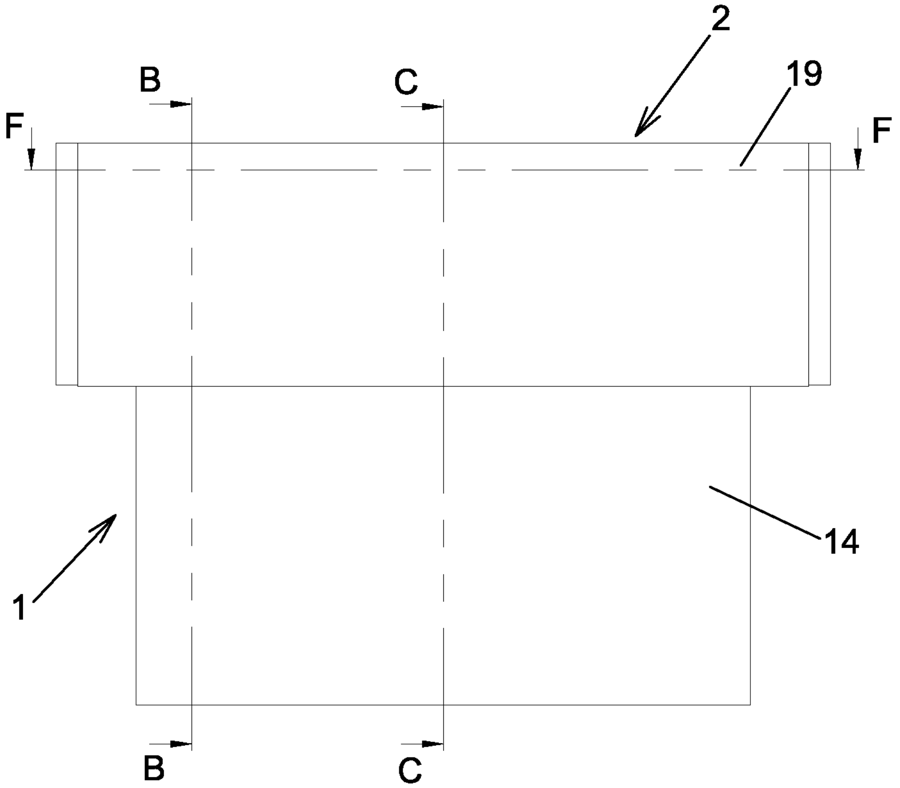
FIG. 2 shows a schematic external view, rotated by 90°, of the process chamber and the device according to the invention.
Figure 4:
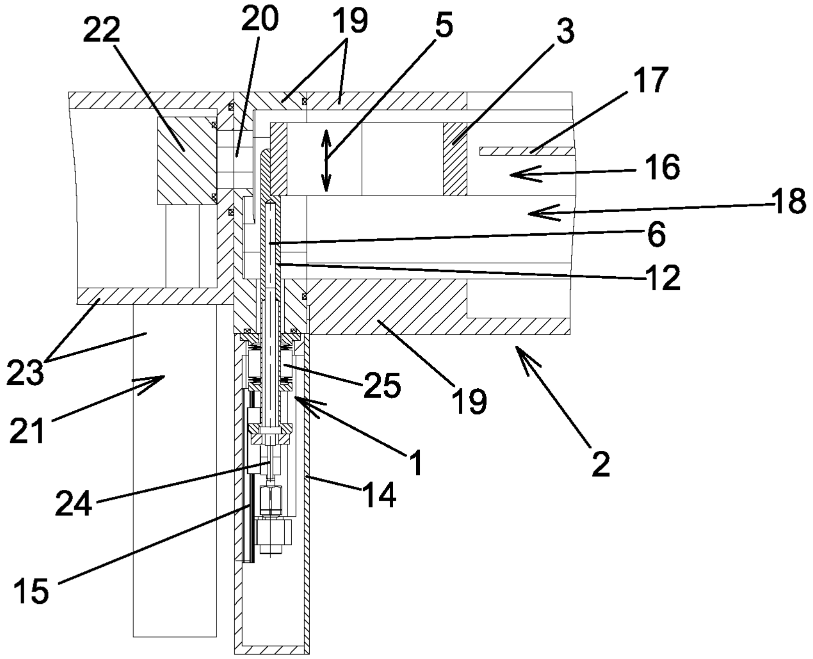
FIG. 4 shows the same terminal position as FIG. 3, however along the section line B-B from FIG. 2.
Figure 5:
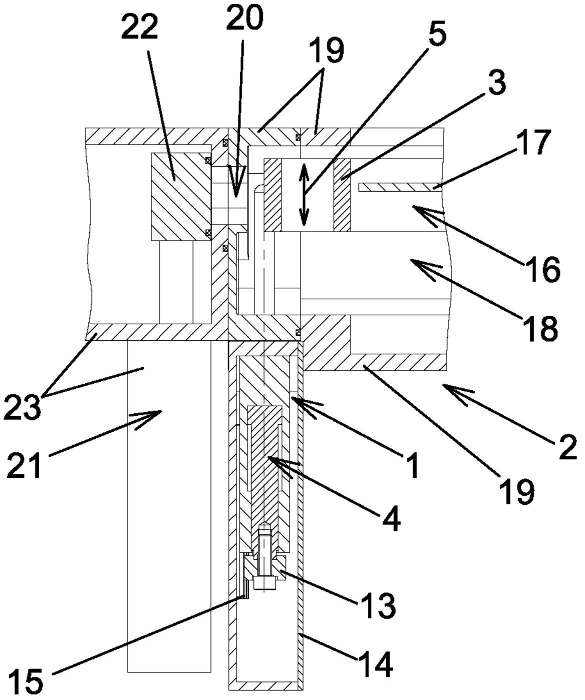
FIG. 5 shows the same terminal position as FIG. 3, however along the section line C-C from FIG. 2.
Figure 7:
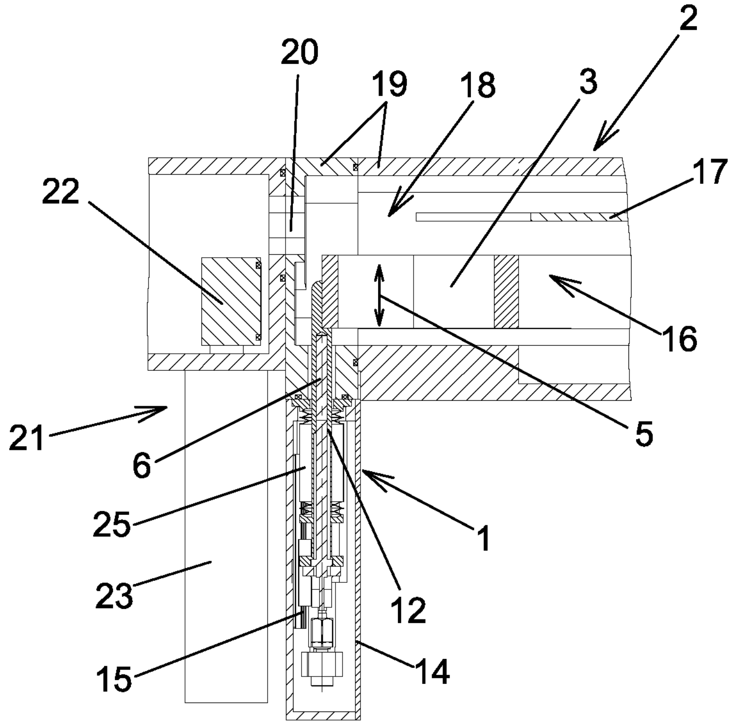
FIG. 7 shows the same terminal position as FIG. 6, however along the section line B-B from FIG. 2.
Figure 8:
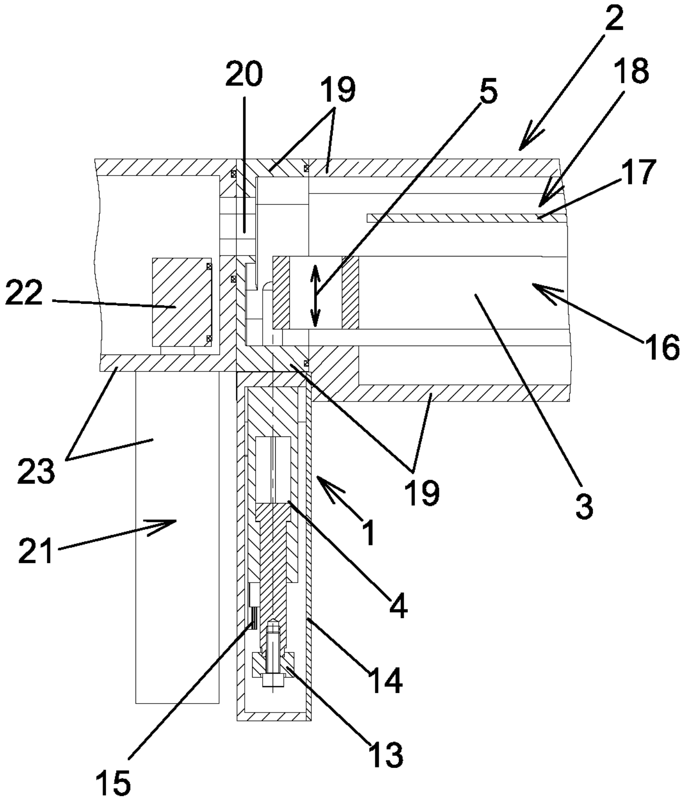
FIG. 8 shows the same terminal position as FIG. 6, however along the section line C-C from FIG. 2.

FIG. 2 shows a schematic external view of the process chamber 2 and the device 1. FIG. 2 serves substantially for visualizing the position of the section lines B-B, C-C and F-F. Sections along the section line B-B are shown in FIGS. 4 and 7. Sections along the section line C-C are shown in FIGS. 5 and 8. The section along the section line F-F is shown in FIG. 11.

Figure 11:
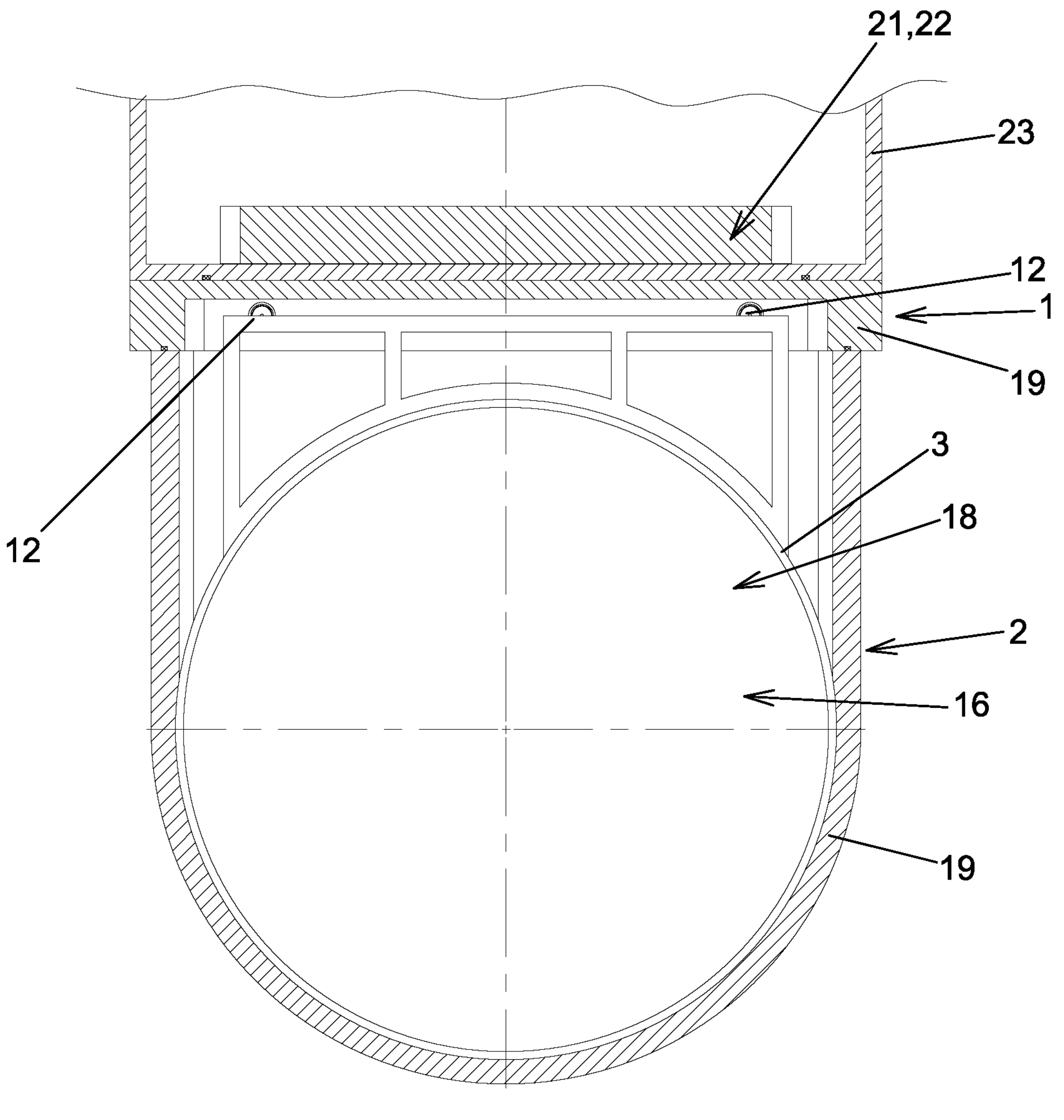
FIG. 11 shows the section along the section line F-F from FIG. 2.

FIG. 11 shows that the aperture shield 3 implemented in this exemplary embodiment is at least in regions configured so as to be annular and encloses in an annular manner an aperture interior 16 for receiving the workpiece 17 to be processed. The aperture shield 3 as well as the aperture interior 16 are located in the chamber interior 18 which is surrounded by the chamber wall 19. The workpiece 17 is held or supported in the chamber interior 18 by a holding device not illustrated here but known per se.

As an alternative to the variant illustrated here, the aperture shield 3 could however also be configured as a planar or curved plate which in the one terminal position is disposed in front of the chamber wall opening 20, thus covering but not closing the latter. The aperture shield 3 in the other terminal position could open up the chamber wall opening 20.

The sectional illustrations in FIGS. 3, 4 and 5 show the terminal position of the aperture shield 3 in which the latter covers or screens the chamber wall opening 20. FIGS. 6 to 8 show the terminal position of the aperture shield 3 in which the latter opens up the chamber wall opening 20 in the chamber wall 19. In the terminal position according to FIGS. 6, 7 and 8, the workpieces 17 to be processed in the chamber interior 18 can be introduced through the chamber wall opening 20 into the chamber interior 18, and conversely also be retrieved through the chamber wall opening 20 from the chamber interior 18. However, in the terminal position according to FIGS. 3, 4 and 5, the workpiece 17 in this exemplary embodiment is located in the aperture interior 16. This position is chosen if the workpiece 17 is to be processed in a correspondingly homogenous gas atmosphere. The aperture shield 3 in this terminal position supports the desired homogenization, or homogeneity, of the gas distribution in the process chamber 2, and in particular in the aperture interior 16.

It can be readily seen in particular in FIGS. 3 and 6 that the aperture shield 3 of the device 1 in this exemplary embodiment is fixed to two thrust bars 12. A respective heating installation 6 is located in the thrust bars 12. The heating installations 6 are preferably electrically operated. These may be resistance heaters or else inductive heating installations. The current supply takes place by way of the electric cables 24 which here are only illustrated in a shortened manner. The thrust bars 12, by the feedthroughs 25 which are known per se, are routed in a gas-tight and pressure-tight manner through corresponding openings in the device housing 14 and in the chamber wall 19 such that the chamber interior 18 is externally sealed in a pressure-tight and gas-tight manner when the chamber wall opening 20 is correspondingly closed by the closure element 22 of the valve 21.

In the exemplary embodiment shown, the thrust bars 12 are in each case fastened to a guided element 26. The guided element 26 in turn is in each case mounted so as to be linearly displaceable on a guide rail 15. The guide rails 15 in this exemplary embodiment are fixed to the device housing 14. According to the invention, it is provided here that the aperture shield 3 by way at least one interposed compensation element 7, in this exemplary embodiment by way of two interposed compensation elements 7, is connected to the linear drive 4. In the exemplary embodiment shown here, this is achieved by fastening a yoke 13 to the linear drive 4. Two compensation elements 7 are disposed in a mutually spaced apart manner on this yoke 13. Each of these compensation elements 7 in turn is connected to one of the guided elements 26. Each guided element 26 in turn is connected to the aperture shield 3 by way of in each case one thrust bar 12. The connection of the aperture shield 3 to the linear drive 4 by way of the at least one interposed compensation element 7 could of course also be designed differently. The number of interposed components or elements can vary. In any case, it is important that indeed at least one compensation element 7 is interposed between the aperture shield 3 and the linear drive 4, wherein the compensation element 7 enables a relative movement between the aperture shield 3 and the linear drive 4 in the at least one direction transverse, presently orthogonal in this case, to the linear movement directions 5 of the aperture shield 3. Both the directions 8 and the movement directions 5 are depicted in FIGS. 3 and 6. The linear drive 4 effects the movement of the aperture shield 3 in the two mutually opposed movement directions 5. In preferred design embodiments, like the one shown here, the aperture shield 3 is movable by the linear drive 4 exclusively in the two mutually opposite movement directions 5.

By heating the aperture shield 3 by the heating installation 6, the aperture shield 3 can be brought to the optimum temperature for the process to be carried out on the workpiece 17, on the one hand. The temperature of the aperture shield 3 is favorably adjusted precisely such that said temperature of the aperture shield corresponds to the temperature of the gas atmosphere in the chamber interior 18. As a result thereof, a particularly good homogenization of the gas distribution in the process chamber 2, and in particular in the aperture interior 16 here in this exemplary embodiment, is also achieved because thermal and otherwise caused currents, turbulences and the like in the gas can be avoided. On the other hand, however, as a result of the aperture shield 3 and the thrust bar 12 being heated, a temperature gradient in the direction toward the yoke 13 and toward the linear drive 4 is also established because these components are not heated. The compensation elements 7 which are present according to the invention avoid stresses in the device 1 that could be created by these temperature gradients, in that the compensation elements 7 permit a relative movement between the linear drive 4, or the yoke 13, on the one hand, and the thrust bars 12 and the aperture shield 3, on the other hand, in directions 8 transverse or orthogonal to the movement directions 5.

Figure 9:
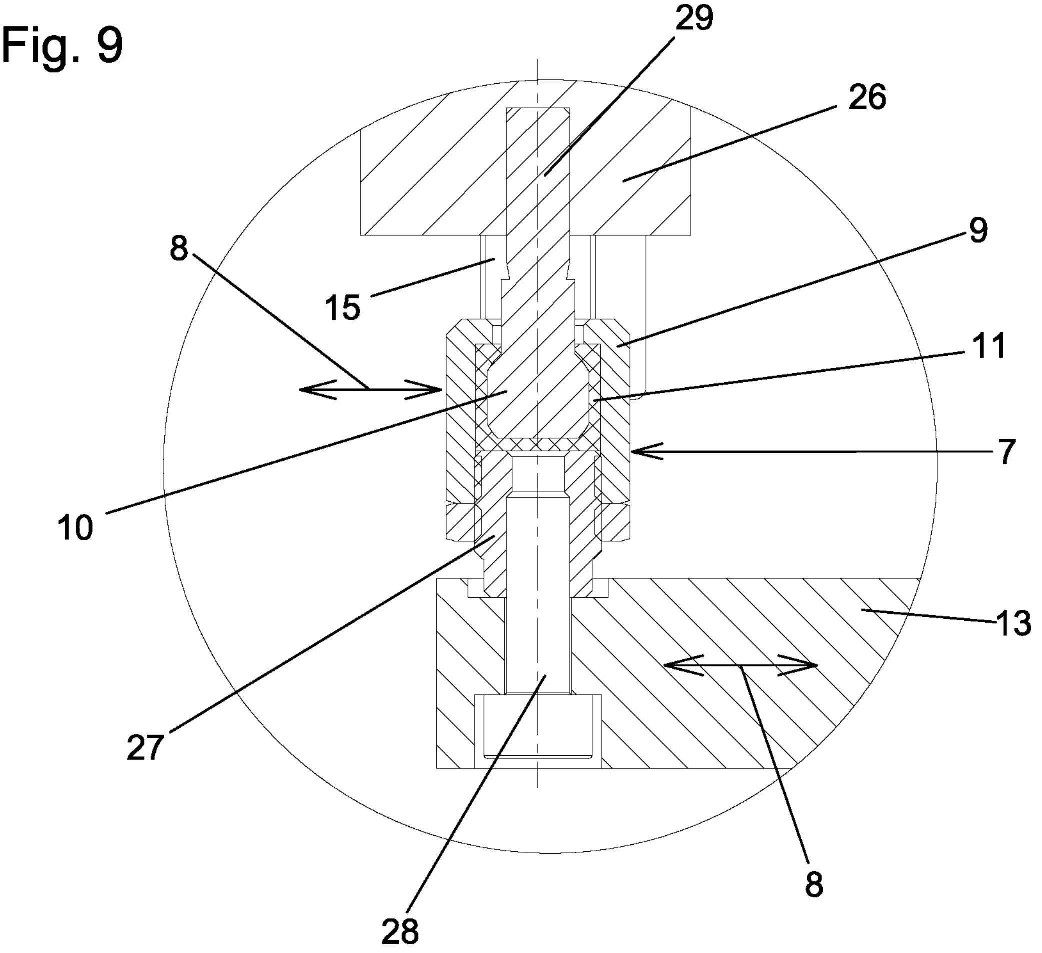
FIG. 9 shows the detail D from FIG. 6 in an enlarged view.

FIG. 9, in an enlarged view, shows the fragment D from FIG. 6 and thus the design embodiment of the compensation elements 7 according to the invention which are used here by way of example. Said compensation elements have a sleeve 9, which could also be referred to as a bushing, and a head 10 which is mounted in the sleeve 9 so as to be movable in the directions 8. The sleeve 9 in the exemplary embodiment shown by screw-fitting or crimping, for example, is fastened to a first connector element 27 which by a screw 28 is fastened to the yoke 13. In this exemplary embodiment, the head 10 by way of a second connector element 29 is connected to the guided element 26 and in this way to the respective thrust bar 12. Of course, this could also be embodied by a reversal of the arrangement. In any case, it is favorable for an elastically deformable member 11 to be disposed between the sleeve 9 and the head 10, as is also implemented here. This can ensure a position without play between the head 10 and the sleeve 9, on the one hand, or else elastic restoring forces, on the other hand. The deformable member 11 is particularly preferably an elastomer member.

Of course, compensation elements 7 according to the invention could also be embodied differently. However, it is indeed important here that said compensation elements enable a relative movement between the aperture shield 3 and the linear drive 4 in at least one direction 8 transverse, or orthogonal, to the linear movement directions 5 of the aperture shield 3. Moreover however, the compensation elements 7 should of course also be suitable for transferring the movement in the movement directions 5 from the linear drive 4 to the aperture shield 3.

Figure 10:
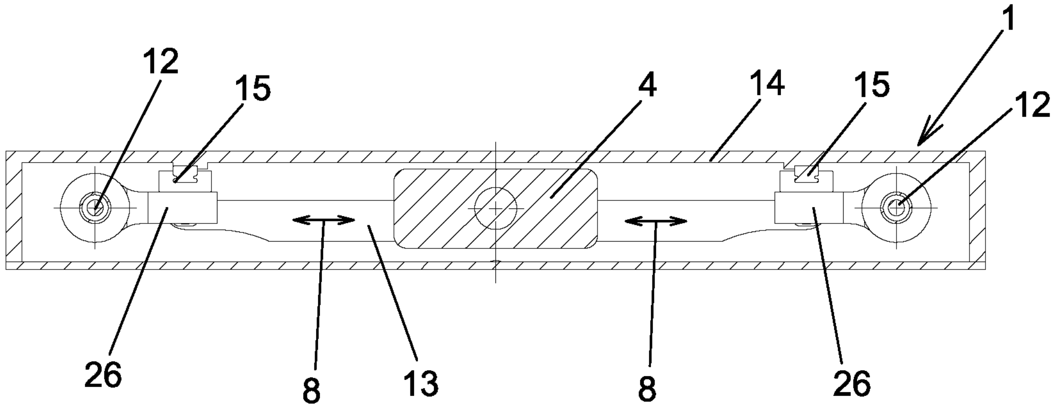
FIG. 10 shows the section along the section line E-E from FIG. 6.

FIG. 10 furthermore shows a section along the section line E-E from FIG. 6. The linear drive 4, the yoke 13 and also the guiding mechanism of the guided elements 26 having the thrust bars 12 on the guide rails 15 fixed to the device housing 14 can be readily seen here.

As is schematically indicated here, the linear drive 4 can be configured as, for example, a pneumatic or hydraulic piston/cylinder unit known per se. Of course, however, other linear drives known per se such as, for example, electric linear drives, may also be used in the context of the invention.

LIST OF REFERENCE SIGNS

1 Device
2 Process chamber
3 Aperture shield
4 Linear drive
5 Movement directions
6 Heating installation
7 Compensation element

8 Direction
9 Sleeve
10 Head
11 Member
12 Thrust bar
13 Yoke
14 Device housing
15 Guide rail
16 Aperture interior
17 Workpiece
18 Chamber interior
19 Chamber wall
20 Chamber wall opening
21 Valve
22 Closure element
23 Valve housing
24 Electric cable
25 Feedthrough
26 Guided element
27 First connector element
28 Screw
29 Second connector element

The invention claimed is:

1. A device for homogenizing a gas distribution in a process chamber, the device comprising:

an aperture shield;

a linear drive configured to move the aperture shield in a reciprocating manner in two mutually opposite linear movement directions between two terminal positions;

a heating installation configured to heat the aperture shield; and at least one interposed compensation element connected between the aperture shield and the linear drive, the at least one interposed compensation element enables a relative movement between the aperture shield and the linear drive in at least one direction transverse to the linear movement directions of the aperture shield.

2. The device according to claim 1, wherein the compensation element includes a sleeve and a head movably mounted in the sleeve so as to be movable in the at least one direction transverse to the linear movement directions of the aperture shield.

3. The device according to claim 2, further comprising an elastically deformable member disposed between the sleeve and the head.

4. The device according to claim 1, further comprising at least one thrust bar fixed to the aperture shield, and the compensation element is disposed between the linear drive and the thrust bar.

5. The device according to claim 4, wherein the at least one thrust bar comprises at least two thrust bars that are fixed to the aperture shield, and each said thrust bar has at least one said interposed compensation element for enabling the relative movement between the aperture shield and the linear drive in the at least one direction transverse to the linear movement directions of the aperture shield, and a yoke is fixed to the linear drive, and each of the thrust bars by way of at least one of the interposed compensation elements is connected to the yoke.

6. The device according to claim 5, wherein the yoke is elongate in the direction transverse to the linear movement directions of the aperture shield, and the compensation elements are connected to the yoke in a mutually spaced apart manner.

7. The device according to claim 4, wherein the heating installation for heating the aperture shield is disposed on or in at least one of the thrust bars.

8. The device according to claim 4, wherein the heating installation includes a respective heating installation for heating the aperture shield disposed in each of the thrust bars.

9. The device according to claim 4, further comprising a device housing and at least one guide rail fixed to the device housing, and the at least one thrust bar is mounted on the at least one guide rail so as to be displaceable parallel to the linear movement directions of the aperture shield.

10. The device according to claim 1, wherein the aperture shield at least in regions is configured so as to be annular, and encloses an aperture interior for receiving a workpiece to be processed.

11. A process chamber comprising:

a chamber wall surrounding a chamber interior;

a chamber wall opening for at least one of introducing at least one workpiece into the chamber interior or for retrieving the workpiece from the chamber interior (18) is disposed in the chamber wall; and the device according to claim 1, wherein the aperture shield is in the chamber interior and is movable in a reciprocating manner between the terminal positions, and the aperture shield in one of the terminal positions thereof covers the chamber wall opening, and in the other one of the terminal positions thereof opens up the chamber wall opening.

* * * * *